(12) United States Patent
Binder et al.

(10) Patent No.: US 8,720,761 B2
(45) Date of Patent: May 13, 2014

(54) ROOF RACK FOR A VEHICLE AND METHOD FOR FASTENING SAID ROOF RACK

(75) Inventors: Hans Binder, Böhmenkirch (DE); Ottmar Binder, Böhmenkirch (DE)

(73) Assignee: Hans und Ottmar Binder GmbH Oberflachenveredelung, Bohmenkirch (DE)

( * ) Notice: Subject to any disclaimer, the term of this patent is extended or adjusted under 35 U.S.C. 154(b) by 859 days.

(21) Appl. No.: 11/887,745

(22) PCT Filed: Mar. 17, 2006

(86) PCT No.: PCT/EP2006/002451
§ 371 (c)(1),
(2), (4) Date: Oct. 3, 2007

(87) PCT Pub. No.: WO2006/111228
PCT Pub. Date: Oct. 26, 2006

(65) Prior Publication Data
US 2009/0026238 A1 Jan. 29, 2009

(30) Foreign Application Priority Data
Apr. 19, 2005 (DE) .......................... 10 2005 017 884

(51) Int. Cl.
*B60R 9/058* (2006.01)

(52) U.S. Cl.
USPC ....... 224/557; 224/309; 224/325; 248/222.41

(58) Field of Classification Search
USPC ......... 224/309, 322, 325, 331, 557, 314, 555; 280/769; 248/221.12, 222.41
See application file for complete search history.

(56) References Cited

U.S. PATENT DOCUMENTS

| | | | | |
|---|---|---|---|---|
| 1,571,762 A | * | 2/1926 | Driscoll | 131/241 |
| 2,554,675 A | * | 5/1951 | Magnetti | 248/211 |
| 2,710,161 A | * | 6/1955 | Haberstump | 248/551 |
| RE26,539 E | * | 3/1969 | Bott | 224/321 |

(Continued)

FOREIGN PATENT DOCUMENTS

| | | |
|---|---|---|
| AT | 171229 | 5/1952 |
| DE | 1 900 793 A | 9/1969 |

(Continued)

OTHER PUBLICATIONS

First Examination Report of the Government of India Patent Office dated Feb. 15, 2010 for parallel application 1585/MUNP/2007, filed Oct. 3, 2007.

(Continued)

*Primary Examiner* — Nathan Newhouse
*Assistant Examiner* — John Cogill
(74) *Attorney, Agent, or Firm* — Harness, Dickey & Pierce, P.L.C.

(57) ABSTRACT

The invention relates to a roof luggage rack (2) for a motor vehicle, comprising at least one roof drip molding (3) provided with a fastening device (5) for the detachable installation on the roof of the motor vehicle. It is provided that the fastening device (5) is a sliding fastening device (6). The invention furthermore relates to a corresponding method for fastening the roof luggage rack (2).

17 Claims, 4 Drawing Sheets

(56) References Cited

U.S. PATENT DOCUMENTS

Figure 1:
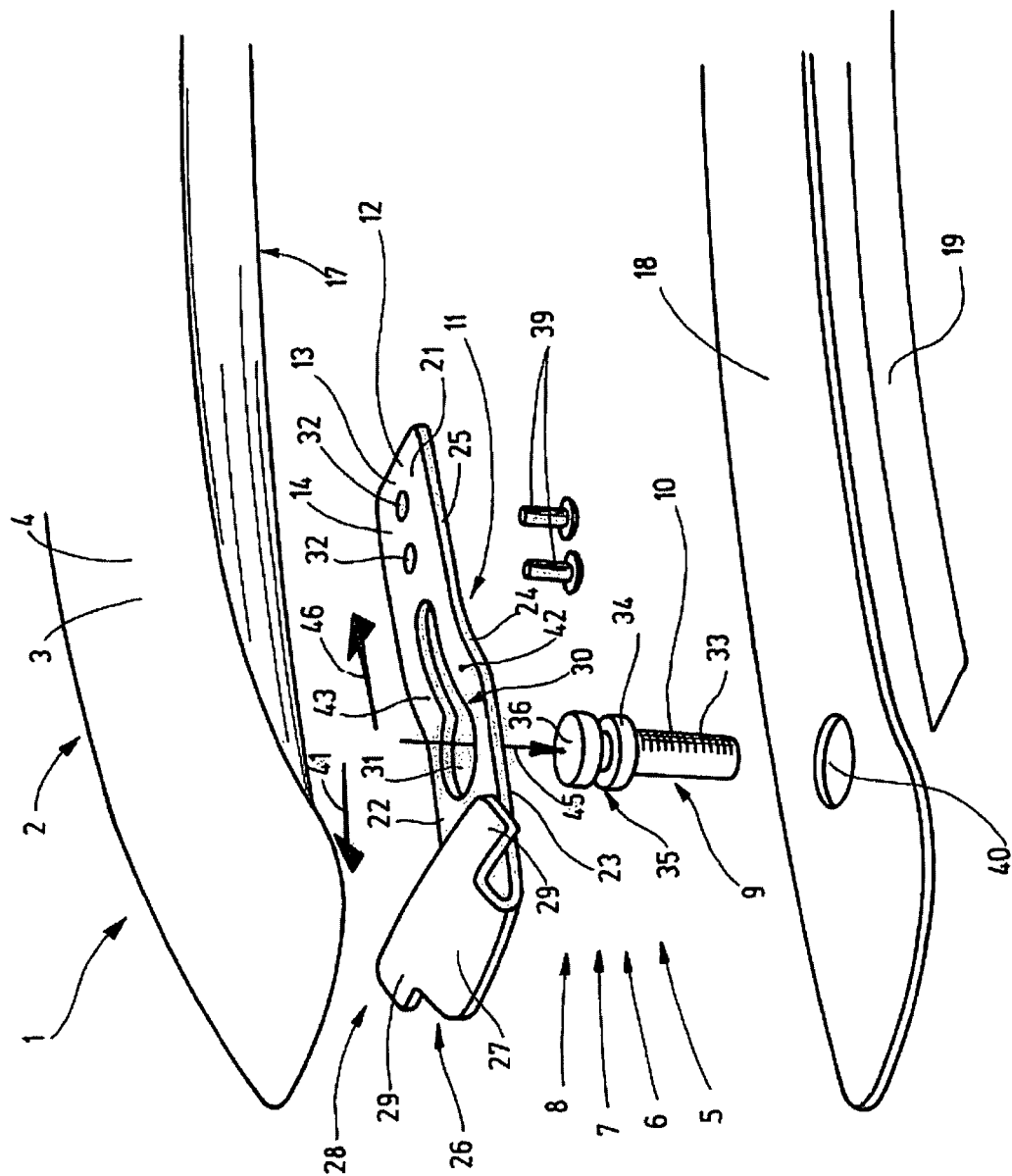

| | | | |
|---|---|---|---|
| 3,473,773 A * | 10/1969 | Meyer | 248/222.41 |
| 4,317,416 A * | 3/1982 | Baum et al. | 108/157.1 |
| 4,470,716 A * | 9/1984 | Welch | 403/254 |
| 4,473,178 A * | 9/1984 | Bott | 224/324 |
| 4,858,803 A * | 8/1989 | Gerber | 224/329 |
| 5,002,216 A * | 3/1991 | Gerber | 224/329 |
| 5,518,157 A * | 5/1996 | Evels et al. | 224/309 |
| 5,577,649 A * | 11/1996 | Lee et al. | 224/321 |
| 6,250,528 B1 * | 6/2001 | Lumpe et al. | 224/326 |
| 7,540,536 B2 * | 6/2009 | Hall | 280/801.1 |
| 7,980,437 B2 * | 7/2011 | Binder et al. | 224/326 |
| 2006/0163297 A1 * | 7/2006 | Moreau | 224/321 |

FOREIGN PATENT DOCUMENTS

| | | |
|---|---|---|
| DE | 81 36 803.8 | 5/1982 |
| DE | 3841 188 A1 | 6/1990 |
| DE | 41 08 302 C2 | 4/1998 |
| DE | 203 17 894 U1 | 3/2004 |
| DE | 20 2004 018079 U1 | 1/2005 |
| DE | 103 53 687 | 5/2005 |
| EP | 0 503 310 B1 | 10/1994 |
| EP | 0 806 321 A | 11/1997 |
| EP | 1 348 597 A | 10/2003 |
| GB | 2 325 202 A | 11/1998 |
| JP | 10-217863 A | 8/1998 |
| JP | 11-348672 A | 12/1999 |

OTHER PUBLICATIONS

Office Action in parallel Japanese procedure (JP 2008-506942) mailed May 17, 2011.
International Search Report for PCT/EP2006/002451, ISA/EP, mailed Jun. 28, 2006.
International Preliminary Report on Patentability with annexes (in German) and English translation of the annexes, dated Jul. 11, 2007.
English Translation of the International Preliminary Report on Patentability for PCT/EP2006/002451.
English Translation of EP0806321A2, cited Oct. 3, 2007.
English Translation of DE202004018079U1, cited Oct. 3, 2007.

* cited by examiner

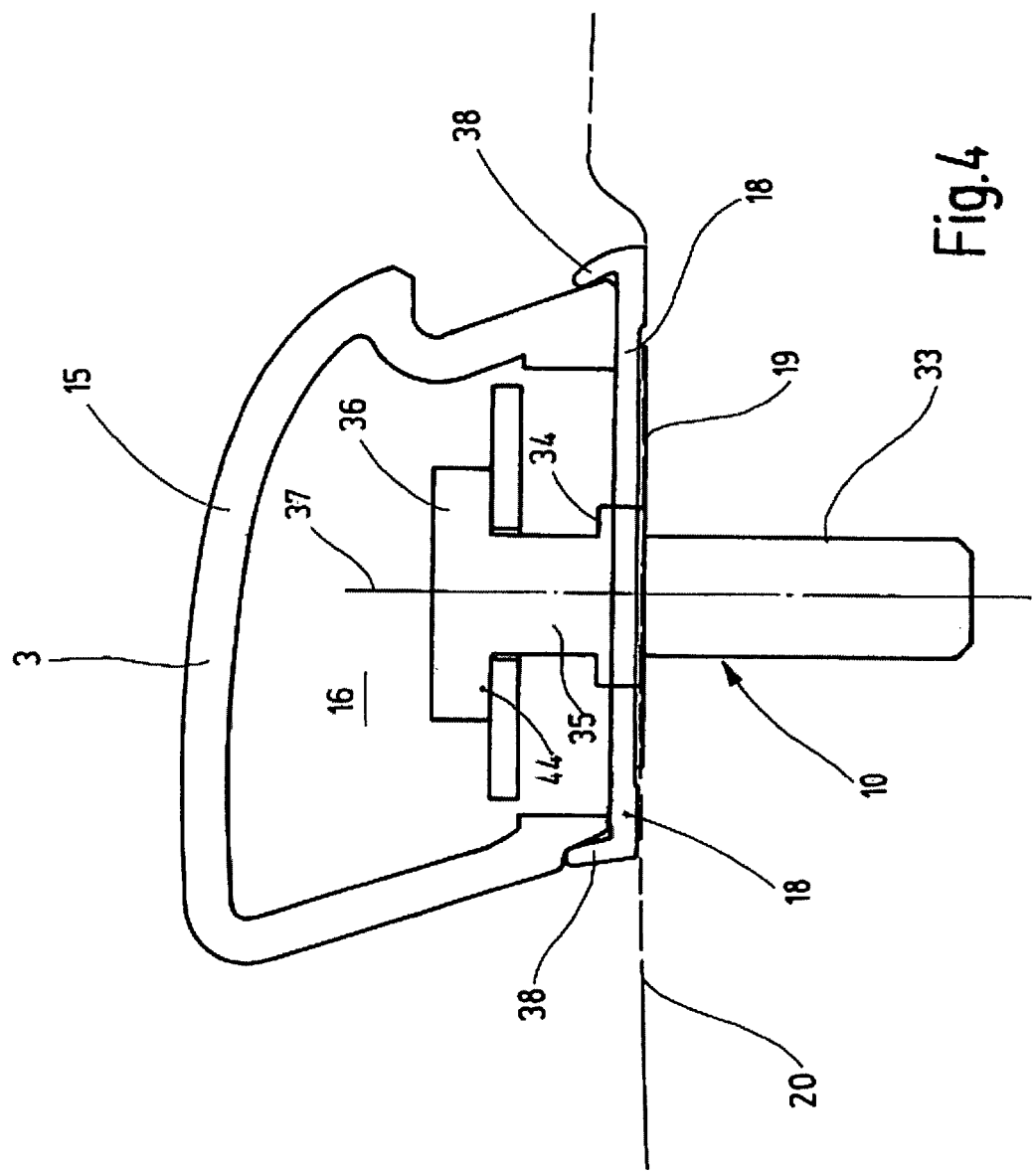

ROOF RACK FOR A VEHICLE AND METHOD FOR FASTENING SAID ROOF RACK

CROSS-REFERENCE TO RELATED APPLICATIONS

This application is a 371 National Stage of International application No. PCT/EP2006/002451, filed Mar. 17, 2006. This application claims the benefit of DE 10 2005 017 884.7, filed Apr. 19, 2005. The disclosure(s) of the above applications are incorporated herein by reference.

The invention relates to a roof luggage rack for a motor vehicle, comprising at least one roof drip molding provided with a fastening device for the detachable installation on the roof of the motor vehicle.

Roof luggage racks of the type mentioned above are characterized substantially by at least one roof drip molding, preferably two roof drip moldings extending parallel to and at a distance from one another, wherein the fastening of the respective roof drip molding, which with the bottom thereof rests on the roof of the vehicle, optionally while interposing a seal or the like, should not interfere with the aesthetic appearance, if possible. For this purpose, it is known to screw threaded pins into threaded holes provided at the bottom of the roof drip molding. For the installation, the roof drip molding with the protruding threaded pins is placed on the roof of the motor vehicle such that the threaded pins engage receiving holes in the vehicle roof. Thereafter, the roof drip molding is fastened by means of retaining nuts, which are screwed onto the threaded pins from the inside of the motor vehicle. The known fastening device is effective, however it requires complex installation.

It is therefore the object of the invention to create a roof luggage rack for a motor vehicle of the type mentioned above, wherein the rack can be securely installed and fastened quickly and in a simple manner.

This object is achieved according to the invention in that the fastening device is a sliding fastening device. Accordingly, attachment is achieved in that the roof luggage rack is placed on the roof of the motor vehicle and for fastening purposes is then only displaced, which is to say that a displacement motion of the roof drip molding relative to the roof of the motor vehicle is sufficient to fasten the roof drip molding. Fastening can thus be performed from the outside and only requires the aforementioned sliding motion, which is to say the complex screw assembly steps required from the inside of the motor vehicle are eliminated.

A further development of the invention provides that the fastening device is a sliding rear-engaging fastening device. This shall be interpreted as a device in which due to the sliding movement a rear engagement is achieved, which brings about the fastening of the roof drip molding on the roof of the motor vehicle.

Preferably, it may be provided that the fastening device is a sliding rear-engaging clamping fastening device. As a result of the sliding motion, the rear engagement is brought about and furthermore a clamping effect is achieved, which preferably firmly presses the roof drip molding onto the roof so that the roof drip molding is held in place without clearance. Furthermore, the clamping effect may prevent or at least hamper automatic displacement, particularly a push-back motion that counteracts the aforementioned sliding motion.

One further development of the invention provides that the fastening device comprises at least one insertion projection and at least one holder for the insertion projection. So as to fasten the roof drip molding, the insertion projection is inserted in the holder. Then the sliding motion is performed, which extends laterally, particularly perpendicularly to the direction of the insertion motion.

It is preferable if the insertion projection is associated with the roof and if the holder is associated with the roof drip molding. In particular, it is provided that the insertion projection is preassembled on the roof of the motor vehicle so that it protrudes from the roof panel. Then the roof drip molding is installed in that it is placed with the holder on the insertion projection and then displaced transversely to the same.

Alternatively, it is of course also possible that the insertion projection is associated with the roof drip molding and the holder is associated with the roof. In such a case, the insertion projection is provided on the roof drip molding. The roof drip molding equipped in this way is associated with the roof of the motor vehicle in that the insertion projection is inserted in a holder on the roof of the motor vehicle and that then the roof drip molding is displaced—transversely to the same—relative to the roof for fastening purposes.

Furthermore, it is advantageous if the insertion projection comprises a rear-engaging step that forms an axial retaining element. During the sliding operation, the rear-engaging step brings about a rear engagement between the insertion projection and the holder so that these two parts can no longer be separated from one another in a direction that is directed opposite to the insertion direction because a positive fit is achieved. In particular, it may be provided that the insertion projection comprises a reduced shaft section for forming the rear-engaging step. The insertion projection in particular comprises a head, which preferably connects to the reduced shaft section. The holder in particularly comprises an elongated hole. This means that for the installation of the roof drip molding the insertion projection is first placed in the holder and then the transverse displacement thereto is performed, wherein the head brings about rear engagement at the edge regions of the elongated hole, achieving a positive fit. So as to be able to insert the insertion projection in the elongated hole, the latter comprises a region having a widened cross-section for inserting the head of the insertion projection.

A further development of the invention provides that the holder is configured on a retaining part that is attached to the roof drip molding. The holder may be configured directly on the roof drip molding or—as mentioned above—on a separate part that is attached to the roof drip molding, preferably detachably attached, namely the retaining part. The retaining part may preferably be a sheet metal part, particularly a spring steel sheet part.

It is preferable that the retaining part forms or comprises a bevel for the clamping action preferably achieved by means of the rear-engaging step. Accordingly, the rear-engaging step is stopped by the bevel during the displacement performed for the installation. As a result, this produces a downward pulling force, which firmly tensions the roof drip molding on the roof of the motor vehicle. Particularly when the insertion projection and/or the holder, particularly the retaining part, is inherently spring-loaded, the afore-mentioned tensioning of the components is implemented while using the suspension travel. In particular, at least one involved component is configured to be inherently elastic so as to bring about the clamping effect. If a spring steel sheet part is selected as the retaining part, the spring steel sheet applies the aforementioned tension. In addition, unintentional displacement, particularly an unintentional push-back motion of the roof drip molding relative to the roof, can be prevented or impaired by the clamped retention.

According to a further development of the invention, it may be provided that the insertion projection is a stud bolt. This bolt is mounted on the roof of the motor vehicle. Then, the roof drip molding is added on and fastened by means of displacement. In the course of this application, only one insertion projection and one holder for the fastening device are mentioned. It is preferable, however, if a plurality of such elements are distributed across the length of the roof drip molding to guarantee secure fastening.

So as to secure a roof drip molding that has assumed the final position against a push-back motion and consequently against loosening, it is preferable if a sliding position securing device is provided, which after completion of the installation prevents the displacement of the roof drip molding relative to the roof and therefore prevents automatic disassembly of the roof luggage rack.

The invention furthermore relates to a method for fastening a roof luggage rack for a motor vehicle, comprising at least one roof drip molding provided with a fastening device for the detachable installation on the roof of the motor vehicle, wherein the roof drip molding is fastened by means of an insertion and displacement motion.

Figure 2:
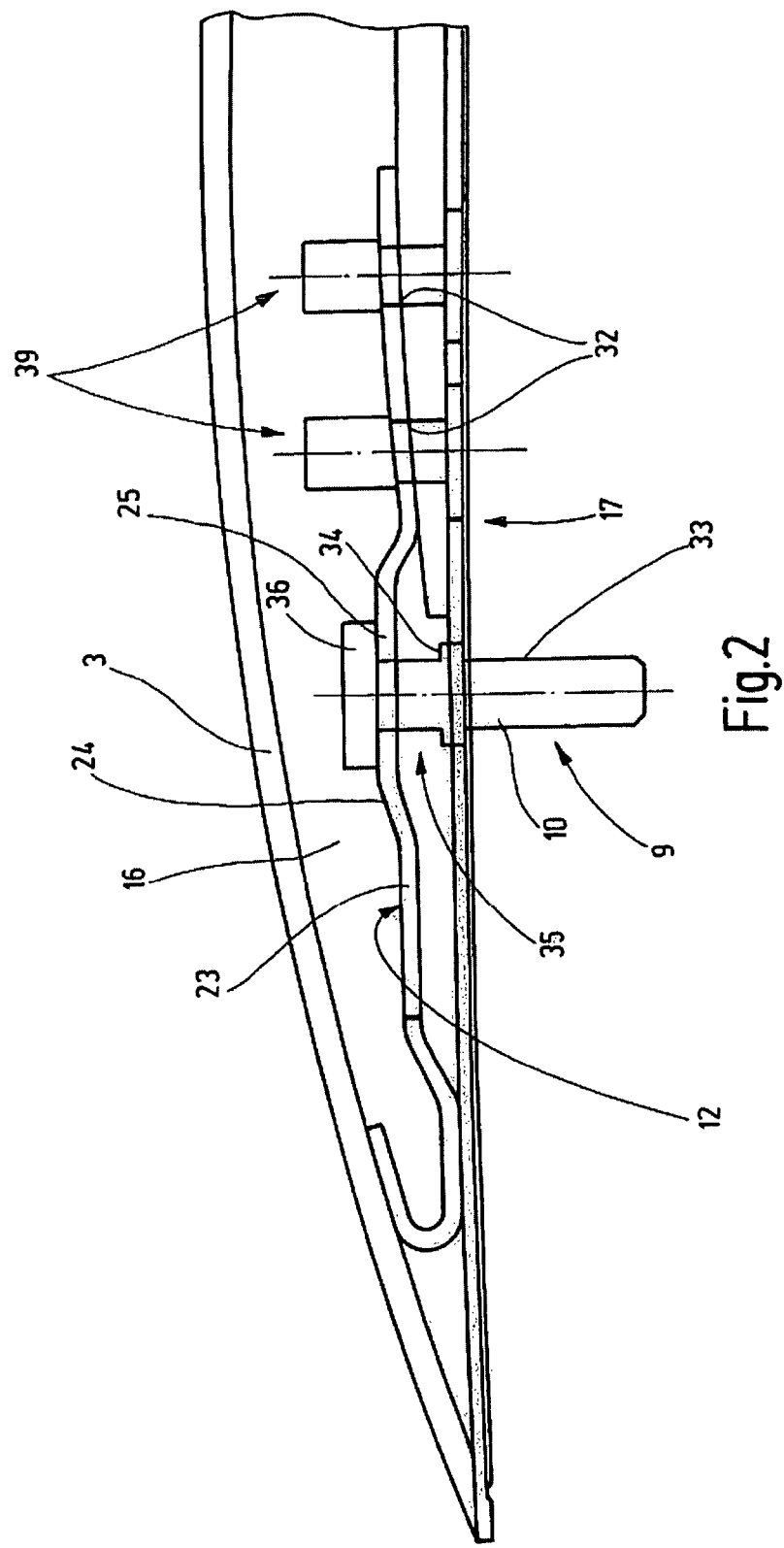
Figure 3:
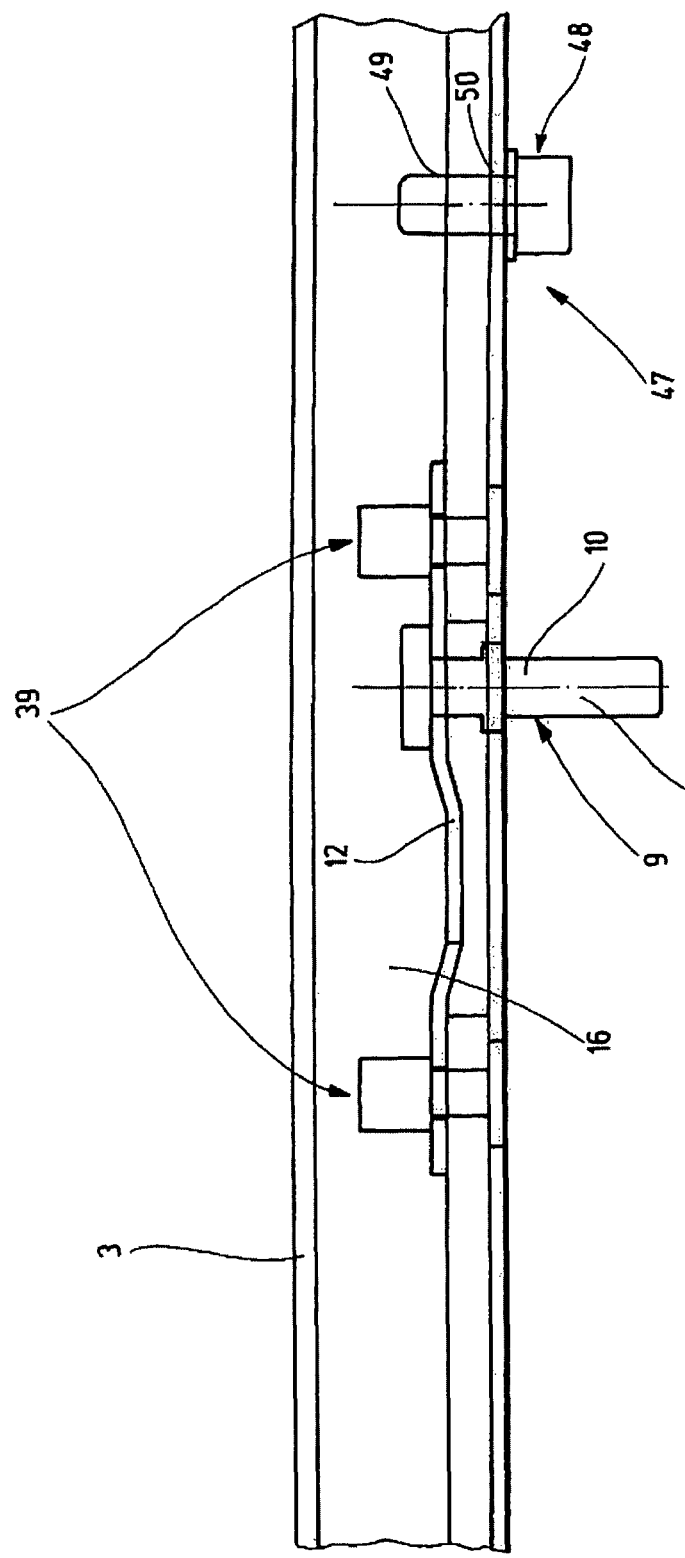

The drawings illustrate the invention by way of an exemplary embodiment, wherein:

FIG. 1 is a perspective view of the end region of a roof drip molding of a roof luggage rack comprising a fastening device, FIG. 2 is a longitudinal sectional view of the illustration according to FIG. 1, FIG. 3 is a longitudinal sectional view of the center region of the roof drip molding, and FIG. 4 is a cross-sectional view of the subject matter illustrated according to FIG. 3.

FIG. 1 shows an end region 1 of a roof luggage rack 2, comprising at least one roof drip molding 3 forming a roof rail 4. It is preferable if two roof drip moldings 3 are fastened at a distance from each other on the roof of the vehicle. On the roof drip moldings 3, additional devices can be installed, for example bicycle racks, hard-shell ski cases and the like, wherein optionally transverse beams are used, which are fastened to the roof drip moldings 3.

So as to retain a roof drip molding 3 on the roof of the motor vehicle, a fastening device 5 is provided, which is configured as a sliding fastening device 6, particularly a sliding rear-engaging fastening device 7, wherein a sliding rear-engaging clamping fastening device 8 is particularly preferred.

The fastening device 5 comprises an insertion projection 9, which is configured as a stud bolt 10. The fastening device 5 furthermore comprises a holder 11, which is configured on a retaining part. The retaining part 12 is a sheet metal part 13, particularly a spring steel sheet part 14. It is preferably made of steel, particularly rust-free spring steel.

The roof drip molding 3 is configured as one piece and flattened in an arc shape at the opposing end regions, as is shown in FIG. 1. According to FIG. 4, the roof drip molding is made of a hollow profile 15, which comprises an interior space 16. The roof drip molding 3 does not comprise any support bases or the like, but instead the bottom 17 (FIG. 1) thereof is associated with the roof of a vehicle while interposing a seal 18 as well as double-sided adhesive strip 19, as is apparent from FIG. 4. The dotted line in FIG. 4 illustrates the roof panel 20 of the roof of the motor vehicle.

The retaining part 12 forming a steel bracket 21 is provided with a metal strip 22 made of spring material, comprising a straight center piece 23, a bent intermediate piece 24 and a straight end piece 25. The end region 26 of the metal strip 22 is bent upward, forming an arc 27, and provided at the end with a wider region 28 in the shape of lugs 29 on both sides. In the region of the center piece 23 and the intermediate piece 24, the holder 11 is provided in the shape of an elongated hole 30 comprising a region with a widened cross-section 31. The widened cross-section 31 is configured in a substantially circular shape and transitions into the elongated hole section of the elongated hole 30. The widened cross-section 31 is provided in the straight center piece 23; the elongated hole section of the elongated hole 30 extends along the bent intermediate piece 24 up to a region of the end piece 25, which is in turn configured level, which is to say straight. The end piece 25 comprises two through-holes 32.

The stud bolt 10 is provided with a shaft section 33 comprising an external thread, to which an annular flange 34 having a larger diameter than the shaft section 34 connects. Then, a reduced shaft section 35 follows and a head 36 connected thereto. FIG. 4 shows that the diameter of the shaft section 33 substantially corresponds to the diameter of the reduced shaft section 35, that the diameter of the annular flange 34 is larger than the diameters of the shaft section 33 as well as of the reduced shaft section 35 and that the head 36 has a diameter that is larger than the diameter of the annular flange 34. The stud bolt 10 has a longitudinal center line 37.

The seal 18 is fitted to the periphery of the support surface (bottom 17) of the roof drip molding 3 and may comprise—as is apparent from FIG. 4—upwardly projecting edge members 38, which encompass the roof drip molding 3 in some sections.

So as to fasten the retaining part 12 on the inside 16 of the roof drip molding 3, the two lugs 29 are inserted into receiving pockets of the roof drip molding 3, achieving a rear engagement, wherein the pockets are not shown in FIG. 1. Then, the part is fastened by means of two blind rivets 39, which penetrate the through-holes 32 and are fastened to the roof drip molding 3.

The installation of the roof drip molding 3 on the roof of the motor vehicle is performed as follows, wherein hereinafter only one connection between the stud bolt and holder is mentioned, preferably however a plurality of such connections are distributed across the length of the roof drip molding 3 in order to fasten it securely, and in a locked fashion, to the motor vehicle.

First, during the installation the stud bolt 33 is screwed into a corresponding threaded hole of the vehicle roof. The annular flange 34 forms a screw-in stop. The configuration is such that the stud bolt 33 with the section thereof comprising the head 36 protrudes from the roof panel of the motor vehicle. Then, the seal 18 is glued to the vehicle roof, the seal comprising the adhesive strip 19 on the bottom thereof, wherein the stud bolt 33 extends through the through-hole 40 of the seal 18. Now, the roof drip molding 3 comprising the retaining part 12 is fed in the direction of the longitudinal center axis 37 toward the vehicle roof such that the end of the stud bolt 33 enters the holder 11 in the direction of the longitudinal center line 37, wherein the head 36 passes the widened cross-section 31 and the straight center piece 23 rests in the region of the reduced shaft section 35. In this position, the roof drip molding 3 rests on the vehicle roof with the seal 18 being interposed. Now, the roof drip molding 3 is displaced relative to the roof of the vehicle and therefore relative to the stud bolt 33 in the direction of the arrow 41 along the longitudinal extension thereof. In the region of the reduced shaft section 35, the bottom of the head 36 comes in contact with the top 42 of the retaining part 12. This occurs in the region of the bent intermediate piece 24, wherein due to the bend a bevel 43 is formed. From all this it is apparent that due to the bevel and the spring-loaded properties of the retaining part 12 the displacement motion brings about a tensioning of the roof drip molding 3 on the roof of the motor vehicle. The head of the stud bolt 33, the diameter thereof being larger than that of the reduced shaft section 35, forms a positive fit, wherein the dimensions of the elongated hole section of the elongated hole 30 are selected such that the reduced shaft section 35 can be received, the head 36—according to FIG. 4—forms a rear-engaging step 44 for a rear engagement of the edge region of the elongated hole 30, the region likewise representing a rear-engaging step. Due to the afore-mentioned insertion motion (arrow 45 in FIG. 1) as well as the displacement motion (arrow 41 in FIG. 1), the roof drip molding 3 is fastened on the roof of the motor vehicle. So as to detach it, it is only necessary to perform a displacement motion in the direction of the arrow 46 and then lift the roof drip molding 3 off the roof in the direction of the longitudinal center line 37 of the stud bolt 33.

FIG. 2 illustrates the final assembly position, which is to say the position after completion of the installation. While FIG. 1 shows an end region of a roof drip molding 3, FIG. 3 shows a center region of the roof drip molding 3. There, the retaining part 12 is not provided with an arc-shaped angled end region 26, but this region is configured straight, wherein the metal strip 22 in the front and rear end regions thereof is fastened to the roof drip molding 3 by means of the afore-mentioned blind rivet 39. In other respects, the above explanations apply accordingly.

So as to ensure that the roof luggage rack preferably comprising two roof drip molding 3 does not detach automatically, a sliding position securing device 47 is provided, which is formed by at least one threaded screw 48 associated with the roof drip molding 3 as well as a threaded bore 49 configured in the roof drip molding 3. The threaded screw 48 penetrates a positioning hole 50 in the roof panel of the vehicle roof and is screwed into the threaded hole 49. The threaded hole 49 is provided on the bottom 17 of the roof drip molding 3. As a result, a displacement of the roof drip molding 3 relative to the vehicle roof is no longer possible so that the roof drip molding 3 can no longer leave its final assembly position.

The invention claimed is:

1. A roof luggage rack for a motor vehicle, comprising:
   at least one roof drip molding configured as one piece and flattened in an arc shape at opposing end regions, the at least one roof drip molding having a hallow profile defining an interior space, the at least one roof drip molding having a bottom for association with a roof of the motor vehicle and otherwise being support free, a threaded hole configured in the bottom;
   a fastening device for detachable installation of the at least one roof drip molding on the roof of the motor vehicle, the fastening device being a sliding, rear engaging, clamping, fastening device having at least one insertion projection and at least one holder for the insertion projection, the insertion projection being associated with the roof and the holder being associated with the roof drip molding;
   the insertion projection being a stud bolt having a shaft section with an external thread, to which an annular flange having a larger diameter than the shaft section connects, the annular flange forming a screw-in step, the insertion projection further including a head and a reduced shaft section between the annular flange and the head, the head defining a rear engaging step;
   the holder provided on a retaining part disposed within the interior space and attached to the roof drip molding, the retaining part forming a steel bracket provided with a metal strip made of spring material, the retaining part including a straight center piece, a bent intermediate piece and a straight end piece, an end region of the metal strip is bent inward, form an arc, the end region provided at an end thereof with a wider region in the share of first and second laterally spaced lugs, the retaining part integrally including a ramped portion and elongated hole so as to define a bevel for clamped retention, which is brought about by the rear engaging step, the bevel and the rear engaging step being configured to produce a downward pulling force tensioning the roof drip molding on the roof to the motor vehicle, the first and second lugs for insertion into receiving pockets of the roof drip molding for fastening the retaining part on an inside of the at least one roof drip molding through a rear engagement; and
   a sliding position securing device including a threaded screw for penetrating a positioning hole in a roof panel of the motor vehicle and screwed into the threaded hole configured in the bottom of the roof drip molding.

2. The roof luggage rack according to claim 1, wherein the holder defines an elongated hole.

3. The roof luggage rack according to claim 2, wherein the elongated hole includes a region with a widened cross-section for inserting the head of the insertion projection.

4. The roof luggage rack according to claim 1, wherein the retaining part is a sheet metal part, particularly a spring steel sheet part.

5. The roof luggage rack according to claim 1, wherein the retaining part is a spring steel sheet part.

6. The roof luggage rack according to claim 1, wherein the stud bolt includes a shaft downwardly extending from the head and the threaded screw of the sliding position securing device includes a shaft upwardly extending from a head thereof, whereby the shafts extend from their respective heads in opposite directions.

7. A roof luggage rack for a motor vehicle, comprising:
   a roof drip molding configured as one piece and flattened in an arc shape at opposing end regions, the roof drip molding having a hallow profile defining an interior space, the roof drip molding having a bottom for association with a roof of the motor vehicle and a threaded hole configured in the bottom;
   a bolt; and
   a retaining part that cooperates with the bolt for detachable installation of the roof drip molding on the roof of the motor vehicle, the retaining part disposed within the interior space and attached to the roof drip molding, the retaining part including a straight center piece, a bent intermediate piece and a straight end piece, and an end region opposite the straight end piece, the end region of the retaining part bent upward to form an arc and provided at an end thereof with a wider region in the shape of first and second lugs, the retaining part integrally including a ramped portion and elongated hole so as to define a bevel, the bevel and the bolt being cooperatively configured to produce a downward pulling force tensioning the roof drip molding on the roof to the motor vehicle, the first and second lugs for insertion into receiving pockets of the roof drip molding for fastening the retaining part on an inside of the roof drip molding.

8. A roof luggage rack for a motor vehicle comprising:
   a roof drip molding, a threaded bore configured in a bottom of the roof drip molding;
   a retaining part carried by the roof drip molding, the retaining part including an integrally formed first plate portion and second plate portion, the second plate portion oriented at an angle relative to the first plate portion, the second plate portion defining a ramped portion, the retaining part further including an elongated hole, the elongated hole at least partially extending along the ramped portion, the retaining part including a first end and a second end, the retaining part bent adjacent the second end to form an arc, the second end having a width greater than a remainder of the retaining part so as to define first and second laterally spaced lugs for insertion into receiving pockets of the roof drip molding;

a stud bolt having a first end and a second end, the first end for engagement with the roof, the second end having an enlarged annular flange, an enlarged head and a reduced diameter portion between the head and the flange, the reduced diameter portion slidably receiving a portion of the retaining part adjacent the elongated hole such that sliding of the stud bolt along the elongated hole produces a downward pulling force to tension the roof drip molding against the roof; and a sliding position securing device including a threaded screw for penetrating a positioning hole in a roof panel of the motor vehicle and screwed into a threaded hole configured in the bottom of the roof drip molding.

9. The roof luggage rack according to claim 8, wherein the elongated hole at least partially extends along both the first and second plate portions.

10. The roof luggage rack according to claim 9, wherein the elongated hole includes a region with a widened cross-section for inserting the head of the stud bolt.

11. The roof luggage rack according to claim 10, wherein the region is defined by the first plate portion.

12. The roof luggage rack according to claim 8, wherein the stud bolt includes a shaft downwardly extending from the head and the threaded screw of the sliding position securing device includes a shaft upwardly extending from a head thereof, whereby the shafts extend from their respective heads in opposite directions.

13. A roof luggage rack for a motor vehicle comprising:

a roof drip molding having a section defining an interior space, a threaded bore configured in a bottom of the roof drip molding;

a retaining part disposed within the interior space and carried by the roof drip molding, the retaining part including a straight center piece, a bent intermediate piece and a straight end piece, the retaining part defining an integrally formed ramped portion, the retaining part further including an elongated hole, the elongated hole at least partially extending along the ramped portion, the retaining part further including an end opposite the straight end piece that is upwardly bent to form an arc and has a terminal portion with a wider region forming first and second laterally spaced part lugs for insertion into receiving sockets he roof drip molding, a stud bolt having a first end and a second end, the first end for engagement with the roof, the second end having an enlarged annular flange, an enlarged head and a reduced diameter portion between the head and the flange, the reduced diameter portion slidably receiving a portion of the retaining part adjacent the elongated hole such that sliding of the stud bolt along the elongated hole produces a downward pulling force to tension the roof drip molding against the roof; and a sliding position securing device including a threaded screw for penetrating a positioning hole in a roof panel of the motor vehicle and screwed into a threaded hole configured in the bottom of the roof drip molding.

14. The roof luggage rack according to claim 13, wherein the head of the stud bolt forms a rear engaging step.

15. The roof luggage rack according to claim 13, wherein the elongated hole includes a region with a widened cross-section for inserting the head of the stud bolt.

16. The roof luggage rack according to claim 13, wherein the retaining part is a plate.

17. The roof luggage rack according to claim 13, wherein the stud bolt includes a shaft downwardly extending from the head and the threaded screw of the sliding position securing device includes a shaft upwardly extending from a head thereof, whereby the shafts extend from their respective heads in opposite directions.

* * * * *